United States Patent Office 2,705,431
Patented Apr. 5, 1955

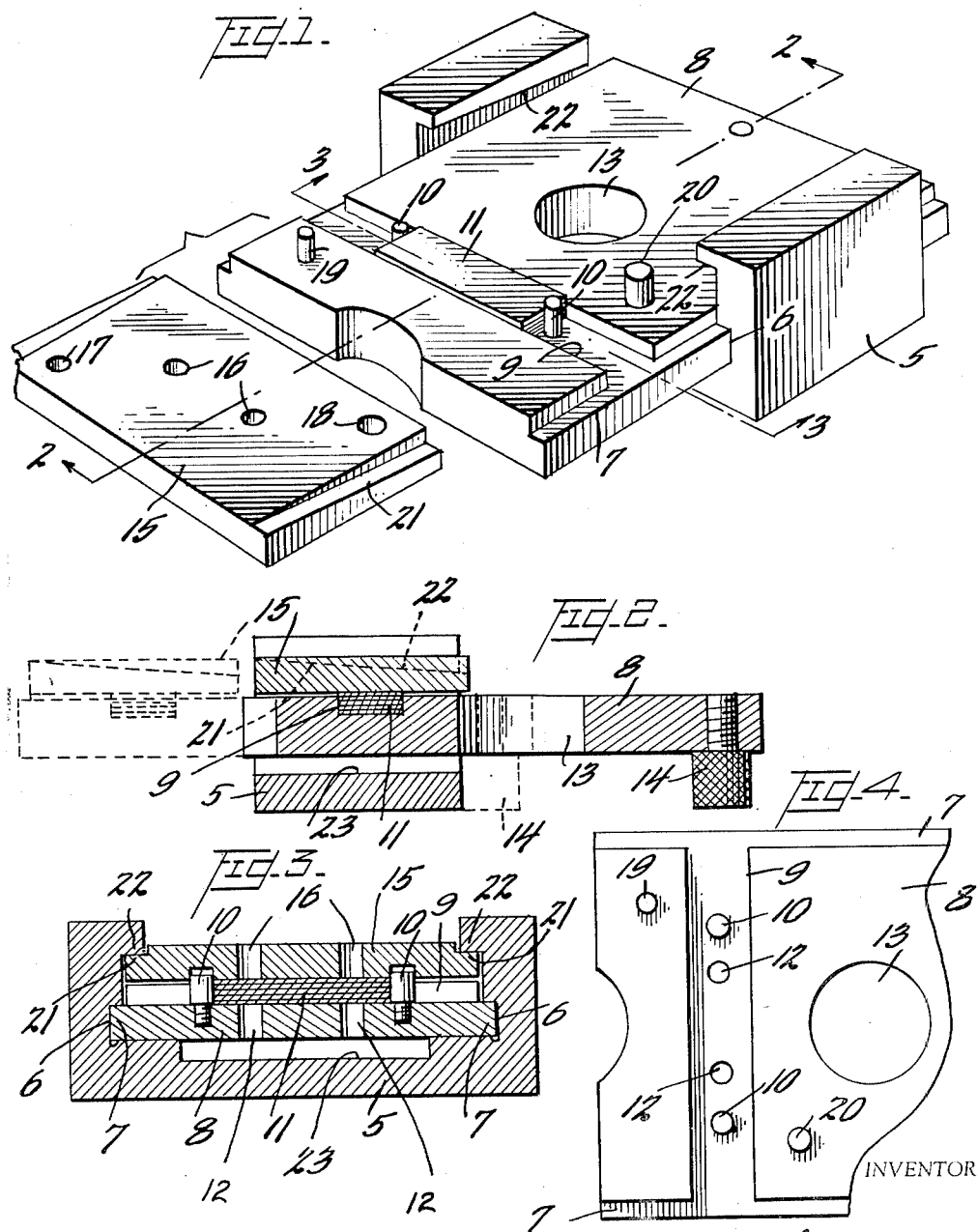

2,705,431

WEDGING DRILL JIG

Joseph D'Angelo, Greensboro, N. C., assignor to Western Electric Company, Incorporated, New York, N. Y., a corporation of New York Application August 7, 1951, Serial No. 240,632

2 Claims. (Cl. 77—62)

This invention relates to work holders for clamping and supporting workpieces, and more particularly to a drill jig for clamping and supporting work while a drilling operation is performed thereon.

The essential requirements of a well designed drill jig are simplicity and speed in operation. It must be capable of being loaded, worked, and unloaded with maximum speed and this is determined to a great extend by the ease and rapidity with which the clamping means can be operated.

It is an object of this invention to provide an efficient means for clamping and supporting workpieces for a drilling operation, which is of simple construction and rapid in operation.

Other objects and advantages to be attained will hereinafter more fully appear from the detailed description when taken in conjunction with the disclosure of the accompanying drawing, in which Fig. 1 is a view in perspective of a work supporting jig or holder, embodying the features of the invention, shown in the open position to load and unload the work;

Fig. 2 is a longitudinal vertical section taken on line 2—2 of Fig. 1. The "work clamping" position is indicated by the solid lines, while the "unloading" and "loading" open position is indicated by the dash lines;

Fig. 3 is a cross-sectional view taken on line 3—3 of Fig. 1; and

Fig. 4 is a fragmentary plan view of the lower work supporting plate.

Referring now to the drawing, an apparatus disclosing one embodiment of the invention includes a U-shaped yoke member or frame 5 having a flat base. This yoke member is provided with a pair of longitudinal grooves 6 adapted to slidably receive flanges 7 of a rectangular lower plate 8 for supporting workpieces 11 to be drilled. The lower plate 8 is provided with a transversely disposed rectangular slot 9 which, in cooperation with a pair of work retaining pins 10, serves to receive and accurately position the stacked workpieces 11. Apertures 12 in the lower jig plate provide clearance for the passage of the drills. An aperture 13 is provided in the work supporting plate 8 as a finger clearance to facilitate the manual operation thereof.

A knurled stud or stop 14 is threadedly engaged to the lower surface of the lower jig or work supporting plate and depends therefrom. This stop maintains the lower plate 8 in a horizontal position and is used to move the plate.

An upper plate 15 is provided with a pair of spaced drill bushings 16 which guide the drill during the drilling operation. These drill bushings are made of tool steel, hardened and ground, and provided with flanged heads which prevent the drill from pitting the plate.

A pair of apertures 17 and 18 in the upper plate are provided for cooperation with a pair of upright positioning dowels 19 and 20 mounted in the lower plate 8. These positioning dowels 19 and 20 are of different diameters in order to facilitate the proper orientation of the upper plate 15 upon the lower plate 8, thereby insuring the accurate positioning of the drill guide bushings 16 in relation to the workpieces 11.

The upper plate is also provided with a pair of tapered side flanges 21. Both of these flanges are of uniformly varying thickness from end to end as shown in Fig. 1 of the drawing. Similarly, the yoke member 5 is formed with complementary tapered flanges 22. These respective tapered portions cooperate to produce a wedging action to firmly clamp the stacked workpieces to be drilled between the upper and lower plates.

A clearance slot 23 (Fig. 3) in the base of yoke member 5 provides space for the ejection of chips produced during the drilling of the work 11.

In using the drill jig, the lower plate 8 is slidably engaged in the guide grooves 6 of the yoke member 5 and the upper plate 15 is removed therefrom to provide the "loading" open position as shown in Fig. 1 with the lower plate in the extreme left-hand position and the knurled depending stud 14 in contact with the yoke member 5. A stack of pieces 11 to be drilled is then inserted between the locating or retaining pins 10 in the slot 9. The upper plate 15 is then placed over the workpieces 11 in a position determined by the dowels 19 and 20 and their cooperating apertures 17 and 18. The drill guide bushings 16 in the upper plate are now accurately positioned relative to the stacked workpieces 11. The assembled lower and upper plates 8, 15, with the workpieces between them, are then moved to the right into the position shown in Fig. 2 by the solid lines. This action forces the tapered flanges 21 of the upper plate 15 into a wedging engagement with the tapered flanges 22 of the yoke 5 to clamp the workpieces 11 between the plates 8 and 15. The workpieces are now ready to be drilled and drills are moved down through the bushings 16 into engagement with the workpieces 11. Upon completion of the drilling operation, the bottom plate 8 is forced to the extreme left-hand position (see Fig. 2, dash lines) to disengage the tapered flanges of the upper plate 15 from those of the yoke member. The upper plate 15 is then lifted off the lower plate 8 and the drilled workpieces 11 are unloaded. The jig is now ready to receive another stack of workpieces and the previous operations are repeated.

Although but one embodiment of this invention has been described, it will be understood that many changes and modifications may be made therein without departing from the spirit and scope of the present invention.

What is claimed is:

1. A drill jig for positioning a plurality of workpieces, a bifurcated yoke having a rectangular groove in each bifurcation, a lower plate slidable in the rectangular grooves in said bifurcations and having a work-receiving groove in its upper face, work-retaining pins positioned in said work-receiving groove to prevent longitudinal sliding motion of the workpieces in said groove, positioning pins mounted on said lower plate and located on both sides of said groove, a work-clamping plate positioned over said work-receiving groove and having apertures therein for receiving said positioning pins so that the work-clamping plate is removably mounted on said lower plate, said bifurcated yoke having tapered slots adjacent said rectangular groove, said work-clamping plate being tapered complementary to said tapered slots for cooperating therewith to force said work-clamping plate toward said lower plate to clamp the workpieces when the work-clamping plate and lower plate are slid into the bifurcated yoke, and guide bushings in said work-clamping plate for guiding a tool to the clamped work.

2. An apparatus for supporting workpieces to be drilled comprising a bifurcated yoke having a rectangular groove in each bifurcation, a lower plate slidable in the grooves in said bifurcations and having a work-receiving groove in its upper face, a depending stud in one end of the lower plate for moving it and maintaining it in a horizontal position, work-retaining pins positioned in said work-receiving groove to retain the workpieces therein, positioning pins mounted on said lower plate and located on both sides of said groove, a work-clamping plate positioned over said work-receiving groove and having apertures therein for receiving said positioning pins so that said work-clamping plate is removably mounted on said lower plate, said bifurcated yoke having tapered slots adjacent said rectangular grooves, said work-clamping plate being tapered complementary to said tapered slots for cooperating therewith to force said work-supporting plate toward said lower plate to clamp said work piece when the work-supporting plate and the lower plate and slid into the bifurcated yoke, said lower plate having finger clearance openings for expediting the removal of said work-clamping plate and said lower plate from the bifurcated yoke, and guide bushings in said work-clamping plate for guiding a tool to the clamped work.

References Cited in the file of this patent

UNITED STATES PATENTS

| | | |
|---|---|---|
| 1,435,729 | Norton | Nov. 14, 1922 |
| 1,742,224 | Swartz | Jan. 7, 1930 |